W. J. Johnson,
Dish Cleaner,
No. 2,442. Reissued Jan. 1, 1867.
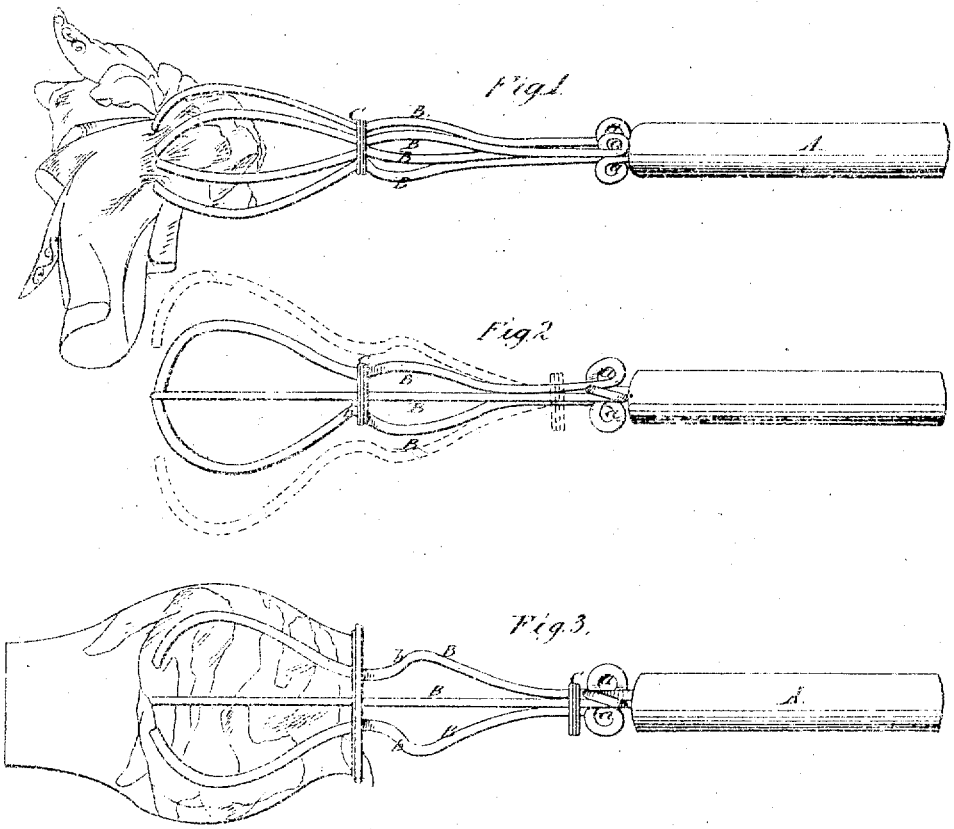
Witnesses:
Edward H. Knight
Solon C. Kemon
Inventor:
W. J. Johnson
by his Attorney
Henry Johnson

BEST AVAILABLE COPY

United States Patent Office.

HENRY JOHNSON, OF CHICAGO, ILLINOIS, ASSIGNEE BY MESNE ASSIGNMENTS OF W. J. JOHNSON.

*Letters Patent No.* 27,225, *dated February* 21, 1860; *reissue No.* 2,442, *dated January* 1, 1867.

IMPROVED SPRING-HOLDER FOR WIPING-CLOTHS.

The Schedule referred to in these Letters Patent and making part of the same.

TO ALL WHOM IT MAY CONCERN:

Be it known that W. J. JOHNSON, of Newton Corner, in the county of Middlesex, and State of Massachusetts, did invent a new and useful Spring-Holder for Wiping-Cloths; and the following is hereby declared to be a full, clear, and exact description of the nature, construction, and operation of the same, reference being had to the accompanying drawings, which are made part of this specification, and in which—

Figure 1 is a view of the handle holding the cloth.

Figure 2 is a view showing open and closed positions.

Figure 3 is a view of the device as applied to a small-mouthed vess

This invention consists of an arrangement of spring fingers, adapted to be furnished with a wet or dry cloth, to be used in cleansing exterior or interior surfaces, dishes, bottles, lamp chimneys, and other hollow articles, especially those difficult to be reached by the hand, and of varying interior diameter. It is of simple construction, is made so as to grasp the cloth to be used, as a swab or mop, or to be clothed with a cloth, as a bibulous envelope, in wiping dry or cleansing the inside of an article or vessel which cannot be reached by the hand, and protecting the hand from becoming soiled, or scalded with hot water, if such should be used.

In the drawings, A is a handle, having two or more wires B B, which may be of either round or flat metal, and which will possess sufficient elasticity to open, as represented by the red lines in fig. 2, when they are not maintained in a closed position by the slide C. The wires B B have an innate elasticity, but it is increased by giving each a coil, near the handle, forming eyes *a a*, and the wires are so bent as to form shoulders *b b*, which prevent the slide from slipping back, when it is desired to use the device as a swab or mop, grasping the cloth as in fig. 1, which will be the preferable mode of application, where washing or ablution is intended, as the form, fig. 3, will be preferable, where the cloth forms a bibulous envelope upon the spring fingers, when cleaning or wiping the inside surface of a vessel or hollow object. The curve or swell of the fingers or jaws B enables them in one condition, see fig. 1, to grasp and contain a sufficient portion of the swab rag, and in the condition, fig. 3, to expand and press the cloth in which they are wrapped against the interior surface of the hollow article under treatment. In the former case, the slide C maintains the grasp, and in the latter case the slide is withdrawn so as to give the fingers free expansion to press the cloth against the interior surface. The fingers are capable of collapse to such an extent as to enter at a comparatively small orifice, and to expand to any degree within moderate limits, to suit ordinary cases. They are of course capable of being made on a still larger scale, so as to adapt them to special cases and uses.

Having described the invention, what is claimed therein as new, and as the invention of W. J. JOHNSON, is—

The spring-holder for cloths, consisting of two or more curved spring fingers, arranged substantially as and for the purposes described.

HENRY JOHNSON.

*Assignee by mesne assignment of W. J. Johnson.*

Witnesses:

EDWARD H. KNIGHT,

GEO. W. ROTHWELL.